(12) United States Patent (10) Patent No.: US 8,649,668 B2
Moorer (45) Date of Patent: Feb. 11, 2014

(54) CLIENT PLAYBACK OF STREAMING VIDEO ADAPTED FOR SMOOTH TRANSITIONS AND VIEWING IN ADVANCE DISPLAY MODES

(75) Inventor: James A. Moorer, Panacea, FL (US)

(73) Assignee: Adobe Systems Incorporated, San Jose, CA (US)

( * ) Notice: Subject to any disclaimer, the term of this patent is extended or adjusted under 35 U.S.C. 154(b) by 85 days.

(21) Appl. No.: 13/153,130

(22) Filed: Jun. 3, 2011

(65) Prior Publication Data
US 2013/0129317 A1 May 23, 2013

(51) Int. Cl.
*H04N 5/783* (2006.01)
(52) U.S. Cl.
USPC .......................................... 386/343; 386/350
(58) Field of Classification Search
None
See application file for complete search history.

(56) References Cited

U.S. PATENT DOCUMENTS

| | | | |
|---|---|---|---|
| 5,953,506 A | 9/1999 | Kalra et al. | |
| 7,263,187 B2 | 8/2007 | Pedlow, Jr. et al. | |
| 7,587,454 B2 | 9/2009 | Shabtai et al. | |
| 2004/0244058 A1* | 12/2004 | Carlucci et al. | 725/135 |
| 2006/0136597 A1 | 6/2006 | Shabtai et al. | |
| 2008/0148327 A1* | 6/2008 | Xu | 725/105 |
| 2010/0064052 A1* | 3/2010 | Pickens et al. | 709/231 |
| 2012/0093489 A1* | 4/2012 | Zhang et al. | 386/343 |
| 2013/0132462 A1 | 5/2013 | Moorer | |

OTHER PUBLICATIONS

Chang-Hong Fu, et al., "Efficient Reverse-Play Algorithms for MPEG Video With VCR Support," IEEE Transactions on Circuits and Systems for Video Technology, vol. 16, No. 1, Jan. 2006, 12 pages.
Susanne Boll, et al., "MPEG-L/MRP: Adaptive Streaming of MPEG Videos for Interactive Internet Applications," Proc. 6th Int'l Workshop on Multimedia Information Systems (MIS 2000), Chicago, Oct. 2000, 10 pages.
Bernd Girod, et al., "Advances in Network-adaptive Video Streaming," 2002, 8 pages.
Tao Fang, et al., "An Error-Resilient GOP Structure for Robust Video Transmission," IEEE Transactions on Multimedia, vol. 7, No. 6, Dec. 2005, 8 pages.
Spiridon Bakiras, et al., "Maximizing Network Utilization for Streaming Video," University of Hong Kong Department of Electrical & Electronic Engineering, 2000, 9 pages.
Chia-Wen Lin, et al., "MPEG Video Streaming with VCR Functionality," IEEE Transactions on Circuits and Systems for Video Technology, vol. 11, No. 3, Mar. 2001, 11 pages.

(Continued)

*Primary Examiner* — Huy T Nguyen
*Assistant Examiner* — Eileen Adams
(74) *Attorney, Agent, or Firm* — Wolfe-SBMC

(57) ABSTRACT

Systems and methods are presented for adaptively streaming a time-ordered sequence of video frames from a video server, across a wide area network, to a remote client video device, to accommodate advanced video display modes. Based on indications received from the remote client, the video server obtains and sends to the remote client encodings of video frames adapted to facilitate smooth, timely transitions between display modes at the client, and optimal playback quality across all modes, subject to various operational constraints. Advanced playback modes include fast forward and reverse, slow forward and reverse, frame-by-frame stepping, and other modes that specify displaying video frames on the client at a rate different from the normal display rate, or that specify displaying video frames in a different order than the normal time-ordering of the sequence of video frames. The systems and methods may be incorporated into collaborative online video editing environments.

20 Claims, 7 Drawing Sheets

(56) References Cited

OTHER PUBLICATIONS

Philip Branch, et al. "Congestion Control for Interactive Video-on-Demand over ATM," Real-Time Imaging 5, 315±328 (1999), Article No. rtim.1998.0163, 14 pages.

Chih-Yuan Cheng, et al., "Effective Utilization of Disk Bandwidth for Supporting Interactive Video-on-Demand," Department of Computer Science and Information Engineering, 1996, 8 pages.

Ming-Syan Chen, et al., "Support for Fully Interactive Playout in a Disk-Array-Based Video Server," 1994, 8 pages.

Yi J. Liang, et al., "Low-Latency Streaming of Pre-Encoded Video Using Channel-Adaptive Bitstream Assembly," © 2002 IEEE, 4 pages.

Kostas Psannis, et al., "Full Interactive Functions in MPEG-based Video on Demand Systems," Dept of Electronic & Computer Engineering Brunel University, 2002, 6 pages.

A. Mulder, "Design and Realization of a Video-On-Demand Demonstration System," Eindhoven, Oct. 1995, 52 pages.

Kostas Psannis, et al., "Networked Interactive Media Codec Algorithm," ICGST—CNIR, vol. (8), Issue (1), Jul. 2008, 8 pages.

Kostas Psannis, et al., "MPEG-based Interactive Video Streaming: A Review," 2003, 6 pages.

Kostas Psannis, et al., "A Novel Method for Supporting Full Interactive Media Stream over IP Network," www.icgst.com, 2005, 7 pages.

Kostas Psannis, et al., "Implementing Interactive Operations of MPEG-2 Compressed Video," 2001, 6 pages.

Ailan Hu, Intel Corporation, "Video-on-Demand Broadcasting Protocols: A Comprehensive Study," 2001, 10 pages.

"Proxy Caching for Robust Video Delivery over Lossy Networks," Diese Dissertation ist auf den Internetseiten der Hochschulbibliothek online verfügbar, Tag der mündlichen Prüfung: 7. Sep. 2004, 192 pages.

Microsoft Silverlight, "Delivering Live and On-Demand Smooth Streaming," iStreamPlanet, 2009, 28 pages.

Wallapak Tavanapong, et al., "Design and implementation of a video browsing system for the Internet," SP&E, Copyright Ó 2001 John Wiley & Sons, Ltd., 33 pages.

Matthew Leditschke, et al., "Implementation of MPEG-2 TrickModes," 2006, 6 pages.

Fr'ed'eric Thouin, "Video-on-demand Equipment Allocation," Department of Electrical & Computer Engineering, McGill University, Montreal, Canada, Jul. 2006, 88 pages.

Bharat Bhargava, et al., "MEPG Video Encryption Algorithms," Aug. 13, 2002, 28 pages.

U.S. Appl. No. 13/153,143, filed Jun. 3, 2011, Adobe Systems Incorporated, all pages.

Non-Final Office Action, U.S. Appl. No. 13/153,143, (Apr. 1, 2013), 7 pages.

"Final Office Action", U.S. Appl. No. 13/153,143, (Oct. 11, 2013), 8 pages.

\* cited by examiner

CLIENT PLAYBACK OF STREAMING VIDEO ADAPTED FOR SMOOTH TRANSITIONS AND VIEWING IN ADVANCE DISPLAY MODES

BACKGROUND

Streaming video content over the Internet is commonplace today. Video content providers, including video sharing websites like YouTube, Internet TV services like BBC iPlayer, Google TV, and Hulu, and online video editing services like JayCut, employ a variety of streaming media systems for transporting multimedia to televisions, computers, and portable devices. Streaming video content at a bit rate that is too high may cause packets to be dropped, resulting in corrupted frames and a degraded display of video imagery on the client device. Excessive compression of the video imagery, producing a bit rate that is slower than required, may unnecessarily diminish the quality of the client's viewing experience. In order to insure optimal viewing, automated dynamic adjustments are sometimes made to control the bit rate between server and client according to network bandwidth constraints.

The video playback interface on current video receiving and playback devices typically provides interactive controls that are limited to playback, seek, pause, and stop. Current online video playback systems lack the capability for operating in, and smoothly and adaptively transitioning into and out of, advanced video display modes, such as variable speed playback, frame-by-frame stepping fast forward playback, fast reverse playback, slow forward playback, slow reverse playback, and random navigation of video content streamed over the Internet.

SUMMARY

The description herein discloses various embodiments of systems and methods for receiving an encoding of a time-ordered sequence of video frames from a remote video server over a wide area network; sending to the remote video server an indication of a change in a current frame display rate at the video player for the time-ordered sequence of video frames, or of a reversal in playback direction at the video player for the time-ordered sequence of video frames, where the sending is performed over the wide area network; subsequent to the sending, receiving from the remote video server a different encoding of the time-ordered sequence of video frames, where the different encoding is configured for displaying the time-ordered sequence of video frames on the video player at the changed current frame display rate or in the reversed playback direction; and displaying the different encoding of the time-ordered sequence of video frames at the changed current frame display rate or in the reversed playback direction.

In various embodiments, a memory is coupled to one or more processors, and the memory stores program instructions executable by the one or more processors to implement wide area network video streaming environment as described herein. In these embodiments, the functions described above may be performed via the wide area network video streaming environment. In some embodiments, the system may include a non-transitory computer-readable storage medium storing program instructions that are computer-executable to perform these functions.

Figure 1:
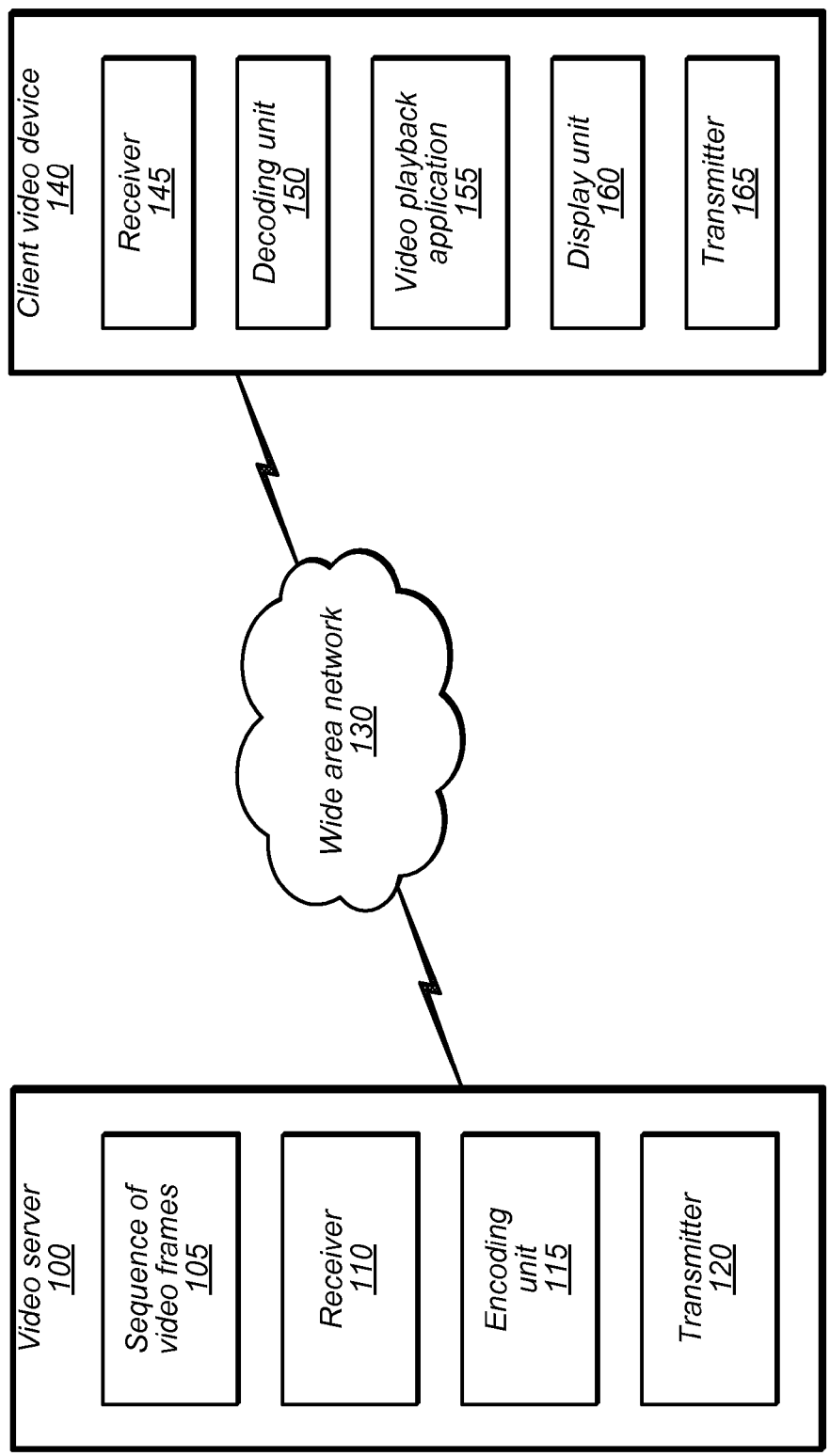
FIG. 1 illustrates one embodiment of system components of a wide area network video streaming environment.

While the present disclosure is described herein by way of example for several embodiments and illustrative drawings, those skilled in the art will recognize that the disclosure is not limited to the embodiments or drawings described. It should be understood that the drawings and detailed description thereto are not intended to limit the claims to the particular form disclosed, but that on the contrary, the intention is to cover modifications, equivalents and alternatives falling within the spirit and scope of the present disclosure as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the following detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is understood that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

INTRODUCTION

The following discussion explores various embodiments of systems and methods for streaming a time-ordered sequence of video frames from a video server to a remote video player to allow playback of the sequence of video frames on the client device in any of various advanced playback modes, and to allow smooth transitions, on the video player's display interface, from one playback mode to another playback mode. According to numerous embodiments, the advanced playback modes may include one or more of fast forward playback, fast reverse playback, slow forward playback, slow reverse playback, and frame-by-frame stepping through the sequence of video frames, as well as any other playback mode that specifies displaying the sequence of video frames on the client interface at a rate that differs from the normal frame display rate, or that specifies displaying the sequence of video frames on the client interface in a different order than the normal time-ordering of the sequence of video frames. Some or all of the video player's playback modes may be modified, according to diverse embodiments, by applying a variable speed control that varies the speed at which video frames are normally displayed on the video player in the various playing modes.

FIG. 1 illustrates one embodiment of system components for adaptively streaming a time-ordered sequence of video frames from video server 100, across wide area network 130, to client video device 140. The sequence of video frames is packaged at the video server in an encoding configured for displaying the sequence of video frames on remote client video device 140 in a particular playback mode, where the particular playback mode is indicated at client video device 140.

During, or in advance of, displaying the sequence of video frames, client video device 140 may detect input, from a user, from a process, or from another entity, to display the sequence of video frames in a particular video frame display mode. The particular video frame display mode may be a normal playback mode, or an advanced playback (trick play) mode. In response, client video device 140 may indicate selection of the particular video frame display mode to remote video server 100. If playing the sequence of video frames in the selected particular video frame display mode requires transitioning from a current video frame display mode, then the indication to remote video server 100 by client video device 140 may include data signifying a need to change the current frame display rate at which the sequence of video frames is currently displayed at the remote client device, or to alter the order in which the sequence of video frames is configured to be sequentially displayed on client video device 140.

In response to receiving the indication from client video device 140, remote video server 100 may obtain an encoding of the sequence of video frames that is configured for displaying playing the sequence of video frames in the selected particular video frame display mode. The encoding obtained by video server 100 may be different from a previous encoding sent to client video device 140 for displaying the sequence of video frame in a current video frame display mode.

The encoding obtained by video server 100 may be chosen by, or generated by, video server 100 based on operational constraints that may include one or more of: display speed and display direction requirements of the selected video frame display mode; a change in the frame display rate at which, or a change in the order in which, the sequence of video frames is configured to be sequentially displayed on client video device 140 in transitioning from the current video frame display mode to the selected video frame display mode; a current transmission rate limiting the speed at which data currently flows between video server 100 and remote client video device 140; a current processing rate at which remote client video device 140 is currently configured to process the sequence of video frames; or any other factors used to insure that the encoding provided by video server 100 permits proper transitioning between playback modes and proper playback of the sequence of video frames on client video device 140 in the selected video frame display mode.

The encoding sent by video server 100 in response to receiving the indication from client video device 140 may be tailored, according to various embodiments, to optimize the quality of playback of the sequence of video frames on client video device 140 in the selected video frame display mode, based on the operational constraints such as the ones described above. For example, if a user of client video device 140 decides to significantly slow down the sequential display of the time-ordered sequence of video frames, then video server 100 may take advantage of the slower frame display rate to increase the resolution of images contained in the sequence of video frames streamed to client video device 140 without raising the bit rate required for streaming video data across wide area network 130 to client video device 140. In case the user of client video device 140 decides to significantly speed up the sequential display of the time-ordered sequence of video frames, then video server 100 may reduce the quality of the images contained in the sequence of video frames streamed to client video device 140 in order to avoid a substantial increase in the rate at which the video data needs to be streamed to client video device 140. By avoiding such an increase, video server 100 can enable client video device 140 to play back the sequence of video frames in the selected video frame display mode without unnecessary degradation in video playback quality.

Adaptive Streaming of Video Imagery to Accommodate Advanced Playback Modes

The following paragraphs describe techniques for adaptive streaming of video imagery to accommodate advanced playback modes using the systems and methods described herein.

The embodiment shown in FIG. 1 illustrates two separate machines, video server 100 and client video device 140, which communicate over wide area network 130.

Video server 100 may include various components, according to various embodiments. In the illustrated embodiment, video server 100 stores or has high-speed access to one or more sequences of video frames 105. A typical such sequence of video frames 105 may be embodied as a collection of video frames containing video imagery which have a normal, or native, time-ordering which is the default order in which the collection of video frames is intended for display on devices such as client video device 140.

A given sequence of video frames 105 may be stored on video server 100 or on a connected device in a variety of forms and formats, according to the embodiments. For example, video frames 105 may be stored in a file format, such as FLV or F4V format, that may be used to deliver video over the Internet to an Adobe Flash Player. Video frames 105 may be encoded, in sundry embodiments, according to various video compression formats, including, but not limited to the Sorensen Spark video compression format, the VP6 video compression format, the H.264 video compression format, the Motion JPEG 2000 format, and so forth. Other video encoding schemes and formats may also be used to encode video frames sequence 105, depending upon requirements of the embodiments. The sequence of video frames 105 may also be kept on video server 100, or on a connected device, in raw form. Video server 100, or a connected device, may store numerous different encodings of the same sequence of video frames 105, and video server 100 may select, from among several different encodings of the same sequence of video frames 105, a particular encoding configured for displaying the sequence of video frames 105 on a particular client video device 140 in a particular playback mode selected at the particular client device.

Receiver 110 of video server 100 may receive communications from client video device 140 or from other entities over wide area network 130. In particular, receiver 110 may receive an indication from client video device 140 of a selection, at client video device 140, of a particular video frame display mode for displaying video frames sequence 105. If playing the sequence of video frames in the selected particular video frame display mode requires transitioning from a current video frame display mode, then the indication to remote video server 100 by client video device 140 may include data signifying a need to change the current frame display rate at which the sequence of video frames is displayed at the remote client device, or to alter the order in which the sequence of video frames is configured to be sequentially displayed on client video device 140.

In some embodiments, video server 100 may also include, or be in communication with, an encoding unit 115 which may generate various encodings of video frames sequence 105 in dynamic, real-time response to information received from client video device 140 indicating selection of a different video playback or display mode at client video device 140. Encoding unit 115 may generate fresh encodings of the sequence of video frames 105 on the fly, as required by one or more client video devices 140, to permit playback of images from the sequence of video frames 105 in various playback modes selected on the one or more client video devices 140. Video server 100 may, in some instances, store dynamically generated encodings of video frames sequence 105 as the encodings are generated.

In some instances, video server 100 may not respond to indications or requests from client video device 140 by responsively generating new encodings of the sequence of video frames 140, but rather by responsively selecting a corresponding, pre-existing encoding of video frames sequence 105 that is already stored on video server 100, or that may be acquired by video server 100 from an external source.

Video server 100 may include or be connected to a transmitter 120 that transmits various encodings of video frame sequence 105 to remote devices such as client video devices 140.

Communication between video server 100 and one or more client video devices 140 may travel over wide area network 130. Wide area network 130 may be embodied as the Internet, or as some other computer network covering a broad geographic area and using any of a variety of network protocols such as the standard Internet Protocol Suite (TCP/IP), Asynchronous Transfer Mode (ATM), or any of numerous other network protocols configured for transmission across wide area network 130.

Client video device 140 may be embodied in a great variety of forms. For example, client video device 140 may be embodied as a lightweight or portable or mobile computing device such as a mobile phone, a portable media player, a tablet computer, a netbook computer, a web camera, a video camera, a video walkie-talkie, a video handheld transceiver, a personal digital assistant, a handheld video game device, a portable television, or any other such lightweight or portable or mobile computing device capable of processing and displaying sequences of video frames according to the systems and methods described herein. Since the systems and methods described herein may also be performed by equipment having more substantial computing power, or by stationary computing equipment, client video device 140 may, according to other embodiments, be realized as a laptop or notebook computer, a mainframe computer system, a workstation, a network computer, a combination device, a set top box, a video game console, a television, or another type of computing or electronic device capable of processing and displaying sequences of video frames according to the systems and methods described in this document.

Client video device 140 may include a video player or online video editing apparatus, depending on the embodiments. Such a video playback apparatus or online video editing apparatus may be variously implemented on client video device 140 as a separate software application, a software application embedded in a Web browser, or as some other type of software application. The video player mechanism or online video editing apparatus may also be implemented in hardware, or as a suitable combination of hardware and software. Such a video player mechanism or online video editing apparatus may be used to display sequences of video frames 105 sent to client video device 140 in encodings provided by video server 100. The particular embodiment of client video device 140 that is illustrated in FIG. 1 contains a video playback application 155. Video playback application 155 may, in some embodiments, facilitate online video editing of video content by individuals who are geographically separated from a data vault storing original video material. Display unit 160 provides a visual display of sequences of video frames 105 that are received at client video device 140 in the encodings provided by video server 100.

Client video device 140 may receive encodings of sequences of video frames 105 from video server 100, and may, in some cases, additionally receive communications from other client video devices 140, via receiver 145.

Decoding unit 150 decodes encodings of the sequence of video frames 105 received from video server 100 to permit the sequential display, on client video device 140, of video frames contained in the encodings. Depending upon its embodiment, client device 105 may also maintain a local cache of video frames contained in the encodings of the sequence of video frames 105 received from video server 100. For example, some smart phones may be configured to cache a limited quantity of video frames gotten from video server 100, while tablet computers having greater memory capacity may cache a larger quantity of video frames, and large desktop computers may cache even larger amounts of data generated when decoding unit 150 decodes encodings of the sequence of video frames 105 received from video server 100.

Client video device 140 may include or be connected to a transmitter 165 that transmits indications, signals, requests, or other information from client video device 140 to video server 100 over wide area network 130. According to some embodiments, transmitter 165 may also permit client video device 140 to communicate with other client video devices 140.

Figure 2:
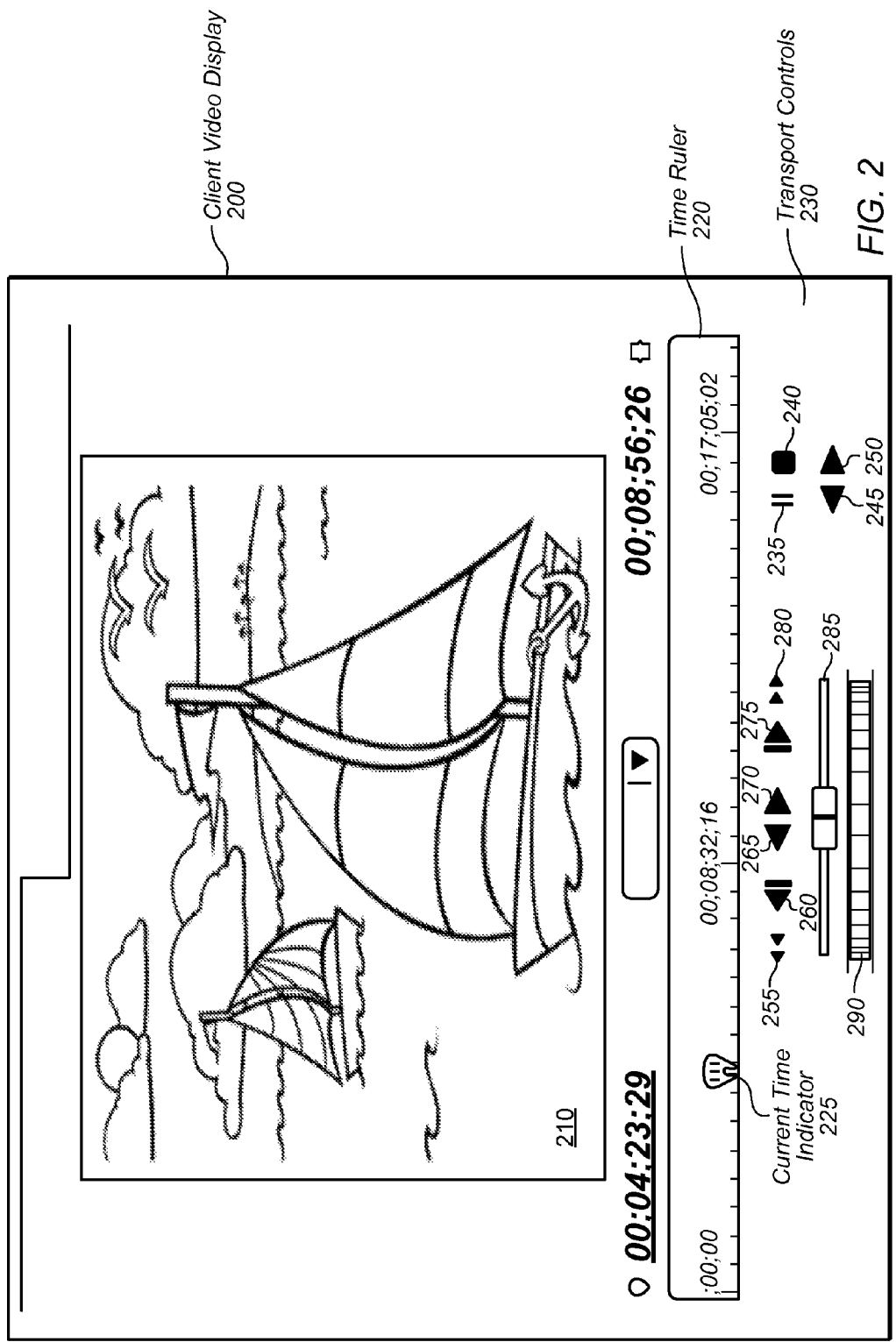
FIG. 2 illustrates one embodiment of a video display interface on a client video playing device.

FIG. 2 illustrates one embodiment of a graphical user interface (GUI) for a video playback apparatus or online video editing apparatus. Such an interface may appear on client video display 200 when the video playback apparatus or online video editing apparatus is operating on client video device 140. Client video display 200 may display various embodiments of such an interface, whose constituent components may vary from one embodiment of the interface to another.

Video monitor 210 sequentially displays images contained in encodings of video frames sequence 105 received by client video device 140. Sequential display of the images on video monitor 210 is controlled according to the video frame playback or display mode currently selected.

Depending upon the video playback or display mode currently controlling the display of the images on video monitor 210, the images may be presented on video monitor 210 in either an automatic frame-by-frame stepping mode, or in a rapid, automated playback mode, or in a manual single-stepping mode, or any other advanced playback mode. According to various trick play, or advanced playback modes, the time order in which video frame images are displayed on video monitor 210 may differ from a normal, or native, time ordering which is the default time order in which the sequence of video frames 105 is intended to be displayed.

Time ruler 220 is a timeline for video frames sequence 105 measuring time distance through the sequence of video frames 105. According to various embodiments, time ruler may be zoomed in or out to change its scale and limit its focus to smaller or larger segments of the entire sequence of video frames 105. In some cases, time ruler 220 may be configured to measure the current span between a chosen in point and a chosen out point of the sequence of video frames 105.

Current time indicator 225 indicates the time location, within the sequence of video frames 105, of the video frame currently designated for display on video monitor 210. Current time indicator 225 may be linked with video monitor 210 to move across time ruler 220 in synchronization with the video frames displayed on video monitor 210. In such instances, current time indicator 225 may move synchronously with video frames as they are displayed in video monitor 210, in automatic response to playback of the sequence of video frames 105 on video monitor 210 in numerous video playback and display modes.

According to some embodiments, current time indicator 225 may also move in direct response to user input to manually change the position of current time indicator 225 on time ruler 220. For example, a user may select a point on time ruler 220 that is not the point at which current time indicator 225 is presently located. In response, current time indicator 225 may move from its current position to the position selected by the user. According to some embodiments, a user may manually drag current time indicator 225 across time ruler 220 to navigate or scroll or scrub through the sequence of video frames 105 on video monitor 210 in random fashion. As the user drags current time indicator 225 across time ruler 220, video monitor 210 may present a subsequence of the sequence of video frames 105 to represent points of time ruler 220 that are traversed by current time indicator 225 during the dragging process. The subsequence may be displayed on video monitor 210 in synchronization with the movement of current time indicator 225 across time ruler 220. If the user reverses the direction of travel of current time indicator 225, the time ordering of the display of the subsequence may differ from the normal, or native, default time ordering in which the sequence of video frames 105 is normally intended to be displayed. Through these and other user manipulations of current time indicator 225, the video player or online video editor may be made to operate in various trick play modes of display.

The interface shown in the embodiment of FIG. 2 also includes transport controls 230, comprising elements allowing a user to control the display of the sequence of video frames 105 on video monitor 210.

Pause control 235 and stop control 240 allow the user to arrest or stop the display of the sequence of video frames 105 on video monitor 210. Slow reverse control 245 and slow forward control 250 permit the user to play video sequences at a slower-than-normal speed, either in the reverse or the forward direction. Similarly, fast reverse (rewind) control 255 and fast forward control 280 permit the user to play video sequences at a faster-than-normal speed, either in the reverse or the forward direction. Normal reverse control 265 and normal forward control 270 permit the user to play video sequences at a normal speed, either in the reverse or the forward direction.

Step-in-reverse (frame bump reverse) control 260 and step-forward (frame bump forward) control 275 permit the user to step through the sequence of video frames 105 a frame at a time. In some embodiments, step-in-reverse control 260 and step-forward control 275 are used to step through the sequence of video frames 105 consecutively in the natural or native time ordering of the sequence of video frames 105. Certain embodiments may modify the operation of step-in-reverse control 260 and step-forward control 275 to skip a designated number of frames while stepping through the sequence of video frames 105, so that the user steps through a proper subsequence of non-consecutive elements of the full sequence of video frames 105. According to some embodiments, the operation of step-in-reverse control 260 and step-forward control 275 may also be modified to automatically step through the sequence of video frames 105 at a designated frame display rate.

Shuttle control 285 may operate in different ways according to different embodiments. According to one embodiment, shuttle control 260 permits the user to vary the playback speed and direction of the sequence of video frames 105 smoothly and continuously. As illustrated in FIG. 2, shuttle control 285 may be embodied as a slider. When a user pushes the shuttle slider rightwards from the center of its travel range, the sequence of video frames 105 begins playing in the forward direction at a speed that is proportional to the degree of displacement of the slider from the center point. The farther the slider is moved to the right, the faster the sequence of video frames 105 is displayed on video monitor 210. When the slider is positioned at the right-hand limit of travel, the sequence of video frames 105 is displayed on video monitor 210 at a maximum forward speed. Leftward movement of the slider from any point in the right-hand portion of its travel range slows the rate at which frames are displayed in the forward direction. Positioning the slider at the center position of its range of travel stops the video at the frame currently displayed when the slider reaches the center position. In an entirely analogous fashion, movement of the slider in the left-hand portion of its travel range causes the frames of the sequence of video frames 105 to be displayed on video monitor 210 in the reverse direction, with the speed of display being in proportion to the degree of displacement of the slider from the center position of its travel range. The video frame display rate changes smoothly and continuously as the shuttle slider moves, ranging from a maximum forward speed to a maximum reverse speed.

Jog wheel 290 may serve to step sequentially, either forwards or backwards, through the sequence of video frames 105. Jog wheel 290 may, in some embodiments, be rotated through a series of discrete ratchet points, either backwards or forwards, rotating from one ratchet point to another in discrete clicks rather than in continuous travel. Rotating jog wheel 290 from one ratchet point to another advances the display of the sequence of video frames 105 one frame at a time in video monitor 210, where the advancement of the images proceeds in the forward direction as the ratchet wheel moves in the forward direction, and the advancement of the images proceeds in reverse as the ratchet wheel moves in reverse. In this manner, jog wheel 290 may operate, according to some embodiments, as a sort of fine-grained, discrete analog of current time indicator 225. Jog wheel 290 thus operates the display of the sequence of video frames 105 in a stepping mode. Rotating jog wheel 290 forwards or backwards moves the video forwards or backwards, starting with the frame that is currently displayed. In some embodiments, jog wheel 290 may be configured to display every other frame from the sequence of video frames 105, or every third or fourth frame, depending on settings for jog wheel 290. Jog wheel 290 may thus permit stepping through the sequence of video frames 105 either consecutively or non-consecutively.

In some embodiments, jog wheel 290 may be rotated through ratchet points without limit in either direction, thus permitting the user to traverse the full extent of the sequence of video frames 105. In other embodiments, jog wheel 290 may operate between left and right detents that limit its travel in either direction. Pegging jog wheel 290 against its left detent may transition the display of the sequence of video frames 105 to normal reverse mode, and pegging jog wheel 290 against its right detent may transition the display of the sequence of video frames 105 to normal forward mode.

The collection of controls illustrated in FIG. 2 and described above is not comprehensive. Various embodiments may include other controls not illustrated in FIG. 2. Some video controls may be dedicated to operation of a single mode, such as normal reverse control 265 and normal forward control 270. Other video display controls may invoke multiple playback modes. For example, current time indicator 225 may operate in either the forward or reverse direction to rapidly skim or to step slowly through the sequence of video frames 105. Depending on the manner in which the user moves current time indicator 225, various playback or display modes may be responsively invoked.

Information based on inputs to the GUI controls shown in FIG. 2 may be transmitted back to video server 100 in dynamic response to the inputs. For example, client video device 140 may send to video server 100 data associated with transitioning the sequential display of video frames 105 on video monitor 210 from one video frame display mode to another video frame display mode, as may be required by input to the GUI controls. Such data may include, but is not limited to, a change in the current frame display rate at client video device 140 for the time-ordered sequence of video frames, or a reversal in playback direction at client video device 140 for the time-ordered sequence of video frames 105. The data may also include a current transmission rate limiting the speed at which bits currently flow between video server 100 and client video device 140. The data may further include a current processing rate at which client video device 140 is currently configured to process the sequence of video frames 105.

Client video device 140 may directly transmit to video server 100 raw input to the GUI controls shown in FIG. 2, or it may first calculate various quantities and state information derived from the raw input to the GUI controls before sending the calculated quantities and state information to video server 100. For example, client video device 140 may report to video server 100 the repositioning of current time indicator 225 to a new position on time ruler 220. Client video device 140 may indicate a newly selected video frame display rate for displaying images from the sequence of video frames 105 on video monitor 210. Client video device 140 may signal to video server 100 a sequence of several video frame display rate adjustments. Client video device 140 may send to video server 100 multiple indications of speed and acceleration data derived from movement of various ones of the GUI controls illustrated in FIG. 2. Input to move various movable actuating controls, such as current time indicator 225, shuttle control 285, jog wheel 290, or other movable transport controls, may be used to calculate speed, acceleration, direction, and other parameters for the movable actuators of some GUI controls. Client video device 140 may also feed sequential inputs across various stationary controls, such as pause control 235, stop control 240, slow reverse control 245, slow forward control 250, rewind control 255, fast forward control 280, normal reverse control 265, normal forward control 270, step-in-reverse control 260 and step-forward control 275, as well as other stationary controls, into calculations to generate data for varying speed, acceleration, and direction of the sequential display of video frames 105 on video monitor 210. Alternatively, video server 100 may make such calculations itself, based on input data received from client video device 140. Client video device 140 may rapidly sample input data, such as mouse-induced clicking, movement, and selection data, to provide an adequate basis for collecting and generating information to be sent to video server 100.

As explained in detail in the following paragraphs, video server 100 may respond to transitions from one video frame display mode to another at client video device 140 by sending appropriate encodings of the time-ordered sequence of video frames 105. The encodings are configured for displaying video frames 105 on client video device 140 at the changed current frame display rate, or in the reversed playback direction, or in a shuffled playback order, as needed to display video frames 105 in a currently selected video frame display mode.

Figure 3:
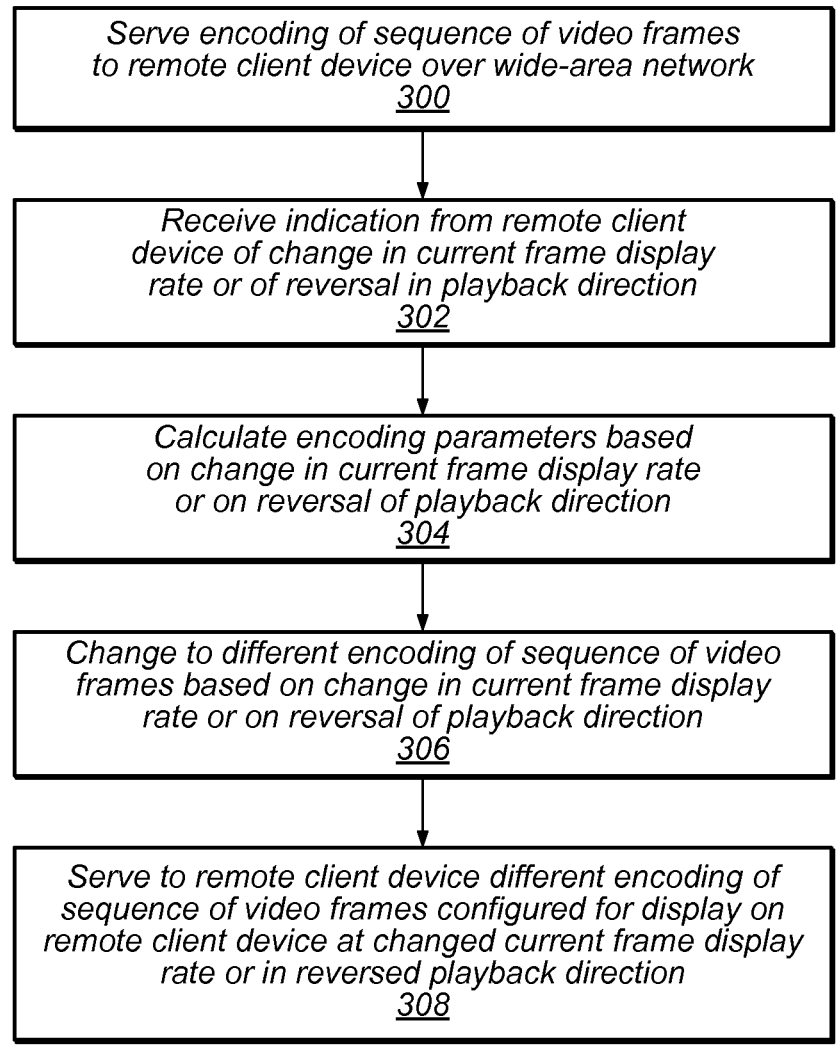
FIG. 3 is a flow diagram illustrating one embodiment of a method for serving a sequence of video frames to a client device in response to indication from the client of a change in the current frame display rate, or of a reversal in playback direction at the remote client device for the sequence of video frames.

FIG. 3 is a flow diagram illustrating one embodiment of a method used by video server 100 for serving encodings of the time-ordered sequence of video frames 105 to client video device 140 to facilitate transitions, at client video device 140, from one video frame display mode to another video frame display mode.

At block 300, video server 100 serves an encoding of the sequence of video frames 105 across wide area network 130 to remote client video device 140. Client video device 140 may decode the received encoding, and display the decoded sequence of video frames 105 according to a current video frame display mode. Alternatively, if it detects input to transition away from a current video frame display mode before it can begin displaying the decoded sequence of video frames in the current video frame display mode, client video device 140 may not display the decoded sequence of video frames. If client video device 140 detects input to transition to another video frame display mode before it can begin decoding the encoding received from video server 100, then it may not decode the received encoding. If client video device 140 detects input to transition to another video frame display mode before it can finish decoding the encoding received from video server 100, then it may abort the decoding process.

At block 302, video server 100 may receive an indication from remote client video device 140 of a change in the current frame display rate at remote client video device 140 for the time-ordered sequence of video frames 105, or of a reversal in playback direction at remote client video device 140 for the time-ordered sequence of video frames 105. As described above, video server 100 may also receive other types of data from remote client video device 140, such as data signifying a need to shuffle the order in which the sequence of video frames is configured to be sequentially displayed on client video device 140.

At block 304, video server 100 may optionally calculate encoding parameters based on data received from client video device 140. Such received data may include, but is not limited to, an indication of a change in the current frame display rate at remote client video device 140 for the time-ordered sequence of video frames 105, or of a revision of the order in which the sequence of video frames 105 is to be displayed on video monitor 210 of remote client video device 140. The calculation of the encoding parameters may also be based on factors discovered or determined by video server 100 that do not depend on data received from remote client video device 140. For example, video server 100 may independently ascertain bandwidth constraints for wide area network 130, or may independently discover hardware configuration data for client video device 140.

Video server 100 may base its choice of an encoding of video frames 105 on the calculated encoding parameters to obtain an encoding of video frames 105 that is specifically adapted to transitioning, from one video frame playback or display mode to another video frame playback or display mode, in accord with current bandwidth constraints for wide area network 130 and with the hardware architecture of client video device 140. Depending on the nature of the transition, video server 100 may be able to obtain an encoding of video frames 105 that is appropriate for the transition without having to calculate any encoding parameters. For example, if the transition at client video device 140 is a simple reversal of playback direction, with no other changes, then video server 100 may directly obtain an encoding of video frames 105 that is configured for playback in the reversed direction without having to calculate encoding parameters.

At block 306, video server 100 changes to a different encoding of the sequence of video frames 105, where the different encoding may be based on a change in the current frame display rate at which video frames are currently configured to be displayed on remote client video device 140. Such a change in the current frame display rate may be needed to transition from one video frame playback or display mode to another video frame playback or display mode. The different encoding may be based, alternatively or additionally, on a revision of the order in which the sequence of video frames 105 is to be displayed on video monitor 210 of remote client video device 140. For example, the different encoding may be based, wholly or partly, on reversing the direction of playback of video frames 105 at client video device 140.

To facilitate the change to a different encoding of the sequence of video frames 105, video server 100 may, in some embodiments, or for some transitions, dynamically generate the different encoding on the fly, in automatic response to the indication received from client video device 140. In other embodiments, or for some other transitions, video server 100 may not responsively generate the different encoding, but rather may select the different encoding from storage containing one or more existing encodings of video frames 105. The selection of the existing encoding may be based on the indication received from client video device 140, and may additionally be based on encoding parameters calculated at block 304. Video server 100 may select a stored encoding that best approximates an optimally encoded sequence of video frames 105.

Whether it is dynamically generated, or is selected from one or more existing encodings, the different encoding, which is different because it differs from a previous encoding served at block 300, is configured for displaying at least a subsequence of the sequence of video frames 105 in a selected video frame display mode, and for making a smooth transition from a previous video frame playback or display mode to a new video frame playback or display mode. The different encoding is typically chosen to optimize the quality of image display and resolution on video monitor 210, given various constraints like bandwidth limitations, processing speed and capacity at client video device 140, and requirements of the new video frame playback or display mode.

At block 308, video server 100 sends the different encoding of the sequence of video frames 105 across wide area network 130 to remote client video device 140. The different encoding is configured for displaying at least a subsequence of the sequence of video frames 105 on video monitor 210 of client video device 140. Video frames 105 may be configured by the encoding to be displayed on video monitor 210 at the indicated changed current frame display rate, or, alternatively or additionally, in an indicated altered order of sequential display. For example, the different encoding may be configured for displaying the video images of video frames 105 in a reversed playback direction.

Figure 4:
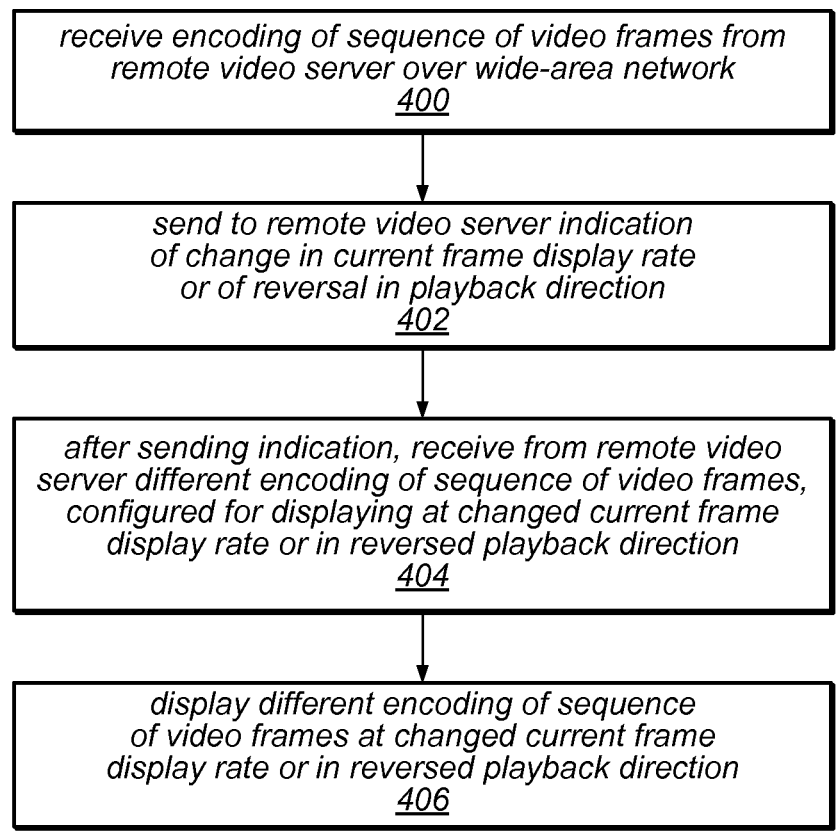
FIG. 4 is a flow diagram illustrating one embodiment of a method for indicating a change in a current frame display rate at a video player for a sequence of video frames, or a reversal in playback direction, and for receiving a different encoding of the sequence of video frames configured for display on the video player at the changed current frame display rate or in the reversed playback direction.

FIG. 4 is a flow diagram illustrating one embodiment of a method used by client video device 140. Client video device 140 may include a video player or an online video editing environment. The method used by client video device 140 is a method for receiving encodings of the sequence of video frames 105 across wide area network 130 from video server 100. The received encodings are designed and constructed to facilitate smooth and timely transitions, at client video device 140, from one video frame display mode to another video frame display mode, and to facilitate correct playback in the other video frame display mode.

At block 400, client video device 140 may receive an encoding of the sequence of video frames 105 sent across wide area network 130 by video server 100. Client video device 140 may decode the received encoding, and display the decoded sequence of video frames 105 according to a current video frame display mode. Alternatively, if it detects input to transition away from a current video frame display mode before it can begin displaying the decoded sequence of video frames in the current video frame display mode, client video device 140 may not display the decoded sequence of video frames. If client video device 140 detects input to transition to another video frame display mode before it can begin decoding the encoding received from video server 100, then it may not decode the received encoding. If client video device 140 detects input to transition to another video frame display mode before it can finish decoding the encoding received from video server 100, then it may abort the decoding process.

At block 402, client video device 140 sends to remote video server 100 an indication of a change in the current frame display rate at which video frames are currently configured to be displayed on remote client video device 140, or of alteration, such as a reversal, of the order in which video frames 105 are configured to be sequentially displayed on client video device 140. As described above, client video device 140 may also send other types of data to remote video server 100, such as speed, acceleration, or directional data derived from movement of the actuating slider of shuttle control 285.

At block 404, and subsequent sending the indication noted at block 402, client video device 140 may receive a different encoding of the sequence of video frames 105, one that differs from the previous encoding received at block 400. The different encoding may be assembled or configured for displaying a subsequence of the sequence of video frames 105 on client video device 140 in a video frame display mode that differs from the previous video frame display mode. The different encoding may be designed to facilitate a smooth transition from the previous video frame display mode to the different video frame display mode. The different encoding may be designed to optimize the quality of image display and resolution on video monitor 210, given various constraints like bandwidth limitations, processing speed and capacity at client video device 140, and requirements of the different video frame display mode. The different encoding may configured for displaying video frames 105 on video monitor 210 at the indicated changed current frame display rate, or, alternatively or additionally, in an indicated altered order of sequential display. For example, the different encoding may be configured for displaying the video images of video frames 105 in a reversed playback direction.

At block 406, client video device 140 decodes the received encoding of the sequence of video frames 105 received from video server 100 to permit the sequential display, on client video device 140, of video frames contained in the encoding. Client video device 140 displays the decoded sequence of video frames 105 according to the current video frame display mode, at the changed current frame display rate, or in an indicated altered order, such as a reversed playback order, of sequential display.

Figure 5:
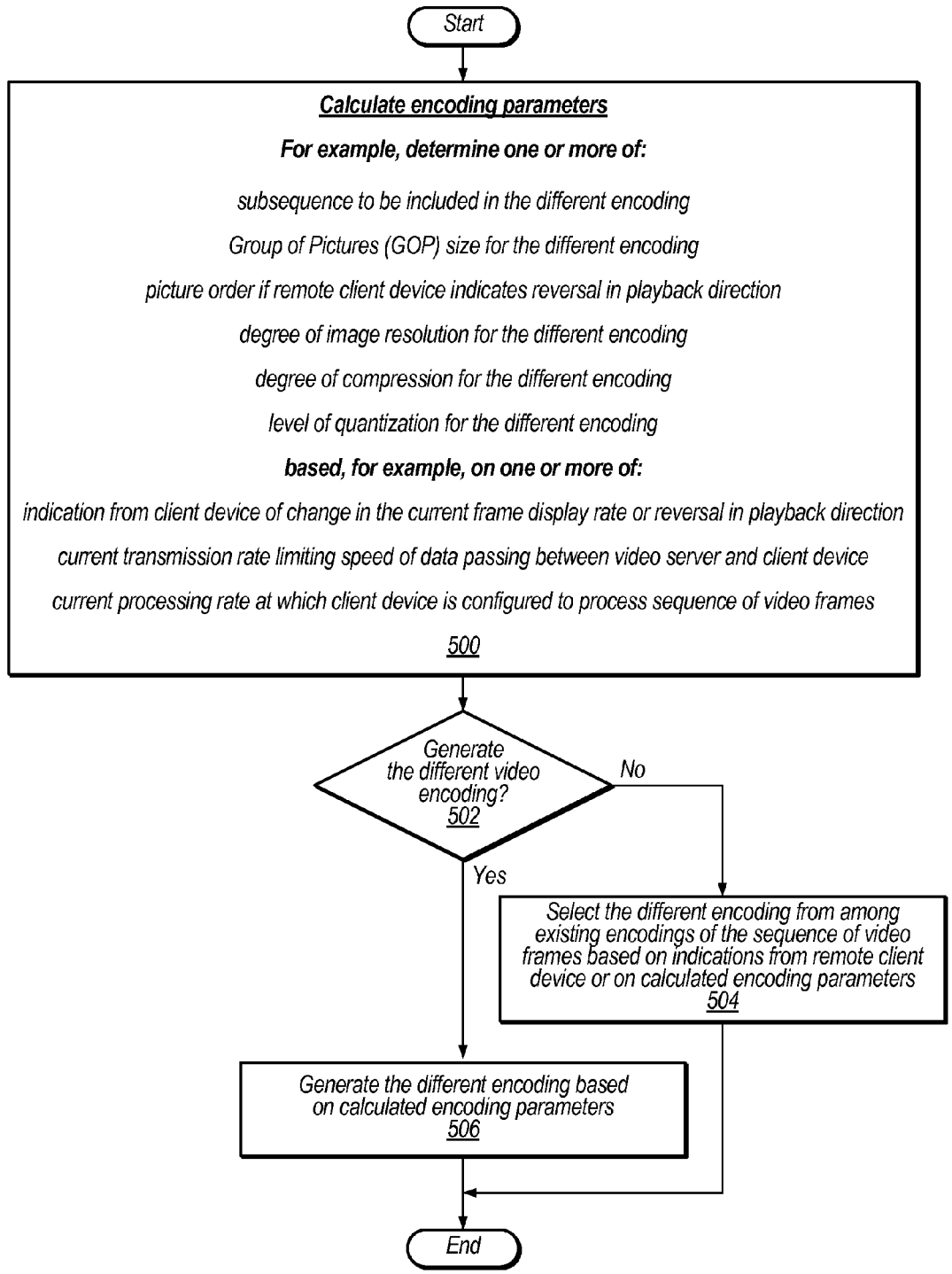
FIG. 5 is a flow diagram illustrating one embodiment of a method for obtaining a different encoding of a sequence of video frames at a video server.

FIG. 5 is a flow diagram illustrating one embodiment of a method for obtaining a different encoding of the sequence of video frames 105 at video server 100. As explained above, video server 100 may not necessarily calculate encoding parameters in response to every single indication of an intended transition from one video frame display mode to another video frame display mode at client video device 140. In some instances and embodiments, video server 100 may not calculate encoding parameters, based on indications from client video device 140 of an impending transition from one video frame display mode to another video frame display mode, or on other incoming data from client video device 140 that indicates a need for a different encoding of the sequence of video frames 105. Video server may or may not calculate encoding parameters as indicated at block 500, depending on whether encoding parameters will be needed to generate or select the different encoding. Thus, actions encapsulated at block 500 may be included in some executions of the method illustrated in FIG. 5, but not included others.

At block 500, video server 100 may calculate one or more video encoding parameters that may be used by video server 100 to generate, or otherwise obtain, as by selection of a pre-existing encoding of the sequence of video frames 105, the different encoding of the sequence of video frames 105 described above. According to various embodiments, video server 100 may calculate any combination of one or more of the parameters listed at block 500, or any combination of other suitable parameters involved in obtaining the different encoding. The particular combination of parameters that video server 100 calculates for an intended transition at client video device 140 may depend on the nature of the intended transition at client video device 140 from one video frame display mode to another video frame display mode.

At block 500, video server 100 may determine which subsequence of the sequence of video frames 105 to include in the different encoding. The parameter set for this purpose may, for example, be an integer subsequence of an integer sequence that indexes the sequence of video frames 105. Such a subsequence may be determined to be the entire original sequence of video frames 105 or to be a proper subsequence of the original sequence of video frames 105. A subsequence determined as a proper subsequence of the original sequence of video frames 105 may contain either one or several video frames. Each determination may depend on the nature of the intended transition at client video device 140 from one video frame display mode to another video frame display mode, or on a current transmission rate limiting the speed of data passing between video server 100 and client video device 140, or on a current processing rate at which client video device 140 is currently configured to process video frame sequences, or upon other determining factors.

Figure 6:
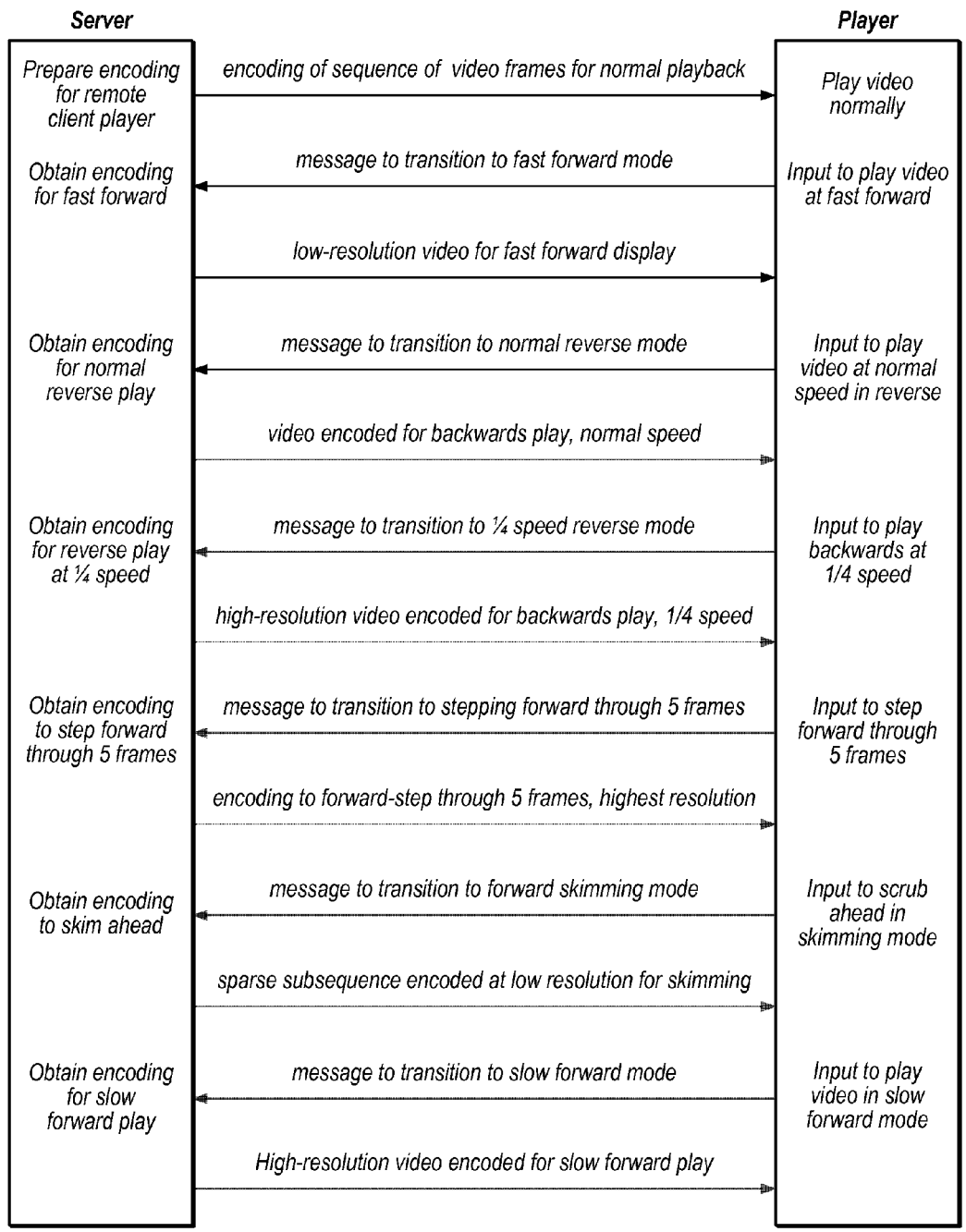
FIG. 6 is a diagram illustrating one embodiment of a series of exchanges between a video server and a remote client video player.

For example, as illustrated in FIG. 6, while a user at client video player 140 is stepping forward through five frames contained in an encoding of the sequence of video frames 105, the user may decide to transition to a forward skimming mode to scrub through the video at high speed. The user may signal such a transition in various ways, depending upon the embodiment of the GUI and upon the user's own intentions. For example, the user may move current time indicator 225 rightward across time ruler 220 at sufficient speed to signal a transition to a skimming mode. Alternatively, the user may move the slider for shuttle control 285 to the right of the center position and sufficiently far to shift into a skimming mode. Upon receiving an indication from client video device 140's user to transition to forward skimming, video server 100 may determine a sparse subsequence of the sequence of video frames 105 to be sequentially displayed on video monitor 210. Between each consecutive pair of frames in the sparse subsequence there may be several frames of the sequence of video frames 105 which video server 100 elected not to include. Video server 100 may thus thin or prune some of the video frames 105 covered in the temporal span of the user's skimming, keeping only a representative sampling of frames that will be contained in the encoding sent back to client video device 140. The extent of such pruning, and the resulting size of the subsequence determined by video server 100, may depend on various factors. For example, broadband bit rate constraints may compel video server 100 to send an encoding of a sparse subsequence to avoid corruption of the encoding during transmission. In addition, limits on the processing speed and memory capacity or other resources at client video device 140 may necessitate choosing a sparse subsequence so that client video device 140 can display the encoded images at the required speed.

In the case of the transition from stepping forward through five frames of video frames 105 to forward skimming through video frames 105, and for many other transitions from a first to a second video frame display mode at client device 140, video server 100 may calculate additional parameters for use in generating or selecting an encoding of the sequence of video frames 105 that facilitates or optimizes both the transition and the proper display of the video frames on video monitor 210 in the second video frame display mode. For example, besides selecting a subsequence of the full sequence of video frames 105, video server 100 may determine one more parameters denoting a degree of image resolution for the images from video frames 105 that will be encapsulated in the encoding that is sent back to client video device 140. Video server 100 may strike a balance between the density of the subsequence it extracts from the complete sequence of video frames 105, and the extent of image compression, corresponding to a degree of image resolution, that it applies to the images contained within the chosen subsequence. Video server 100 may determine a balanced combination of several encoding parameters, which may be balanced to achieve an optimal transition and optimal display of the video frames on video monitor 210 in the second video frame display mode, where the balancing of the parameters and the optimizing of the transition and subsequent display of video images on video monitor 210 are based on various ones of the constraints described in the foregoing paragraphs. Thus, as indicated in FIG. 6, video server 100 may encode a sparse subsequence of the full sequence of video frames 105 at low resolution in order to achieve an optimal result. For any given transition, video server 100 may calculate a variety of encoding parameter combinations according to a variety of embodiments.

FIG. 6 shows that, after viewing the video images in forward skimming mode, the user of client video device 140 next switches to a slow forward mode. As with transitioning to a skimming mode, the user may signal intent to view the video frames in a slow forward mode by several means. For example, if the slider for shuttle control 285 is located to the right of the center point of its travel range, then the user may move the slider leftward to a point that is still right of center, but closer to center. This may indicate the user's desire to view the video at a slow rate that is based on the distance between the center point of the slider's travel and the slider itself. Alternatively, the user may simply actuate slow forward control 250. According to the embodiments, the user's intent may also be signaled in other ways. Upon receiving an indication from the user of client video device 140 to transition to a slow forward mode, video server 100 may decide to encode a subsequence of the sequence of video frames 105 that is not as sparse as the one chosen for forward skimming. As before, the particular subsequence chosen for the transition into slow forward mode may depend on one or several factors, such as bandwidth capacity over wide area network 130 and processing speed and memory capacity or other operating factors prevailing on client video device 140. Based upon these factors, and upon the desired rate at which the video frames are to be displayed on video monitor 210, video server 100 may choose a subsequence that contains consecutive frames of the sequence of video frames 105. In fact, if the current time indicator is positioned at the beginning of the sequence of video frames 105 when the user signals intent to play the video in slow forward mode, then video server 100 may choose the subsequence to be the entire sequence of video frames 105. In some instances, the subsequence chosen may not contain consecutive frames of the sequence of video frames 105. Video server 100 may, in general, choose the subsequence to be the densest or fullest subsequence that can be correctly transmitted to and properly displayed, in slow forward mode, on client video device 140, subject to prevailing system limitations, such as the aforementioned bandwidth constraints on wide area network 130 and processing constraints at client video device 140.

For the illustrated transition from a forward skimming mode to a slow forward mode, in addition to determining a dense subsequence of the full sequence of video frames 105, video server 100 may, depending upon various ones of the constraints described above, also determine a relatively high degree of resolution for the images in the video frames of the subsequence which will be encapsulated in the encoding that is sent to client video device 140. Thus, in the illustrated embodiment, video server 100 may generate or obtain an encoding of a dense subsequence of the sequence of video frames 105 at high resolution, thus enabling video playback on video monitor 210 in a slow forward mode at the highest quality, or within a threshold of the highest quality playback that is possible under various constraints current on wide area network 130 and on client video device 140 itself.

In some embodiments, encodings of subsequences of the sequence of video frames 105, including encodings of the full sequence itself, may gather the video frames into a group of pictures (GOP), or into several groups of pictures (GOPs), according to various schemes known in the art of video coding. A GOP may have a given length or size, and, in general, GOPs may come in different lengths or sizes. In various embodiments of the adaptive video streaming techniques described in this document, the size of the GOPs used in encodings of the sequence of video frames 105 may be varied, based upon any of several factors. Video server 100 may calculate one or more parameters that determine a GOP size used in generating or obtaining encodings of video frames 105.

Depending on the processing power, memory capacity, or other operational characteristics of client video device 140, the amount of time required to decode GOPs contained in encodings received from video server 100 may vary, in proportion to the number of video frames contained in each GOP. Client video device 140, whose video player may be an Adobe Flash Player, may need to decode a large portion or the entire GOP before some of the video frames in the GOP can be reconstructed for display on video monitor 210. The amount of time that client video device 140 spends decoding the GOPs may contribute to an undesirable delay between the point in time at which the user expresses intention to transition from a first video display mode to a second video display mode and the point in time at which client video device 140 begins displaying video frames 105 on video monitor 210. Such a delay may be regarded to as a kind of unwanted latency. Up to a point, such latency may be reduced by decreasing the GOP size for encodings that are sent from video server 100 to client video devices 140. If the transitions in video modes at client video device 140 occur rapidly one after the other, or if they require fast playback of video frames, then video server 100 may calculate a GOP size parameter specifying short GOPs. However, decreasing the GOP size typically increases the average number of bits required to encode each of the video frames, because distributing pictures into shorter GOPs requires encoding more of the video frames as key frames (reference frames), since each GOP normally contains at least one key frame. Thus, video server 100 may balance the decrease in latency achieved by decreasing the size of the GOPs against an increase in the overall bit rate, per video frame, required to transmit video frames 105 from video server 100 to client video device 140. Such factors may also be balanced against other constraints in determining an adequately balanced combination of encoding parameters, in order to achieve optimal transition and display of the encoded video frames on video monitor 210, where the balancing of the parameters and the optimizing of the transition and subsequent display of video images on video monitor 210 are made based on various ones of the constraints described in the foregoing paragraphs.

In some instances, video server 100 may elect to decrease encoding GOP size for a transition from a first video frame display mode to a second video frame display mode. For other instances of transitions from a first video frame display mode to a second video frame display mode, video server 100 may decide to increase the size of GOPs in an encoding. For example, if the user decides to slow down from a very high display rate, video server 100 may increase the GOP size to compensate for increasing the resolution of images sent for viewing at the slower video frame playback rate.

In an attempt to provide rapid and smooth transitions from one viewing mode to another viewing mode, video server 100 may, under certain conditions, immediately encode two GOPs, one containing frames that precede the video frame currently indicated by current time indicator 225, and the other containing frames that follow the video frame currently indicated by current time indicator 225. Such spontaneous, real-time encoding of one or more GOPs may also be conducted for other segments of the sequence of video frames 105, and may be based on anticipation by video server 100 of certain kinds of transitions. For example, if a user of client video device 140 clicks down on a mouse button controlling current time indicator 225, video server 100 may responsively immediately encode two GOPs, as mentioned above, to gain time before the user starts moving current time indicator 225, since the server knows that the user may move current time indicator 225, but does not yet know which way the user will move current time indicator 225. Scrolling or otherwise navigating across time ruler 220 in random fashion, and some other usage of trick play modes, may cause video server 100 to take such pre-emptive, anticipatory steps as spontaneously encoding one or more GOPs of the sequence of video frames 105.

After the user clicks down on a mouse button controlling current time indicator 225 and starts moving current time indicator 225 across time ruler 220, video server 100 may feed one or more preemptively encoded GOPs to client video device 140 to smoothly initiate and speed the transition to some other video frame display mode. Video server 100 may also perform other kinds of anticipatory, pre-emptive encoding.

In some embodiments, client video device 140 may have storage capacity that can be used to store decoded video frames 105. In such cases, client video device 140 may maintain its own locally stored cache of decoded video frames 105, and more decoded video frames 105 may be added to the cache during the time that the video player or online video editor is operating on client video device 140. Such caches may be rapidly accessed and displayed during playback, thus assisting in overcoming latency problems. In some instances, video server 140 may know which decoded video frames 105 are currently stored locally on client video device 140, and may use this information to dispatch suitable encodings to client video device 140 more efficiently.

During the operation of a video player or a collaborative, online video editing tool on client video device 140, input may be received, either from a user or from a machine source, to transition the display of video frames 105 from a current video frame display mode to an intended video display mode. For example, as illustrated in FIG. 6, while the sequences of video frames 105 is being played in fast forward mode, the video player or online video editing tool running on client video device 140 may receive input to begin playing the sequence of video frames 105 at normal speed in reverse order. Such input may be given by various means, depending upon the embodiments. For example, such input may be given by moving the slider for shuttle control 285 to a position left of the center position that indicates normal playback speed. Alternatively, actuation of normal reverse control 265 may also signal such an intention. Upon detection of such input, client video device 140 may send a message to video server 100 indicating the intention to begin playing the sequence of video frames 105 at normal speed in reverse order.

Video server 100 may then determine which subsequence of video frames 105 it will send to client video device 140 in response. In some instances, the subsequence will consist of video frames 105 that are consecutive in the normal, or native, time-ordering for the original sequence of video frames 105. In other instances, based on such constraints as bandwidth limitations across wide area network 130, or limits on the processing speed and memory capacity or other resources at client video device 140, the subsequence chosen by video server 100 will consist of frames which are not consecutive in the normal, or native, time-ordering for the original sequence of video frames 105, but rather form a representative sampling of the original sequence of video frames 105.

In addition to determining which subsequence of the original sequence of video frames 105 may be included in the encoding that will be sent to client video device 140, video server 100 may also determine whether the video frames of the determined subsequence will be individually encoded, or rather distributed into GOPs. Since the encoded subsequence of video frames 105 is intended from playback on client device 140 in reverse order, the encoding may arrange the frames in reverse of their normal order. If the video frames are distributed into GOPs, then video server 100 may arrange the frames within each GOP in reverse of their natural order given in the native time-ordering for the original sequence of video frames 105. Arranging the frames in reverse order within the encoding, and within GOPs of the encoding, may mitigate undesirable latency effects stemming from the decoding process at client video device 140. For example, if the video frames were not arranged in reverse order in the encoding, then before displaying any particular video frame, client video device 140 might have to first decode several other frames intended for display after the particular video frame, before decoding the particular video frame. Such latency effects may be reduced by the expedient of encoding the video frames in reverse order.

Video server 100 may either select or generate such an encoding configured for playing back video frames 105 in normal reverse mode. In some instances, video server 100 may calculate encoding parameters, as noted at block 500, for use in generating or in selecting a suitable encoding of video frames 105 for playback on client video device 140 in normal reverse mode. In other cases, video server 100 may not need to calculate such encoding parameters, but may directly generate or select a suitable encoding. Video server 100 sends to client video device 140 the encoding that is configured for playing back video frames 105 in normal reverse mode on client device 140.

In addition to indicating a reversal of the time order in which video frames 105 are to be sequentially displayed on client video device 140, a user or process may indicate some other rearrangement or reordering of the display order for video frames 105. According to the various embodiments, the normal time order in which video frames 105 are intended for display may be reversed, shuffled, randomized, or otherwise reordered, based on input to transition from one video display mode to another video display mode on client video device

140. Input to trigger such a reordering may be given by a user or a process in a variety of ways, depending upon the embodiments.

For example, a user may rotate jog wheel 290 back and forth through various numbers of ratchet points, switching direction at will. In response to indications of such jog wheel rotation from client video device 140, video server 100 may return one or more encodings of video frames 105 to client device 140 to enable the display of video frames 105 according to the user's input. For example, a user might very rapidly rotate or twirl jog wheel 290 back and forth through a series of ratchet points, and then wait for a display of corresponding video frames 105 on video monitor 210. In response to the user's rapid input, video serve 105 may encode a single subset of video frames 105 that correspond to the series of ratchet points chosen by jog wheel rotation, arranging the corresponding video frames 105 in an order that matches the order in which the series of ratchet points was indicated. Such a reordering of a subset of video frames 105 may not match the native time-ordering which is the default order in which the subset of video frames 105 is intended for display, and it may not be a reversal of the native time-ordering, either. According to various embodiments, the advanced playback modes described herein may encompass all possible orderings of the video frames 105.

The user may also change the order in which video frames 105 are displayed on video monitor 210 by other means, according to numerous embodiments. For example, the user may move current time indicator 225 through a series of time points on time ruler 220, moving current time indicator 225 left and right, and reversing direction at will. For another example, the user may serially actuate several different transport controls one after another to reorder the display of a subset, either proper or improper, of video frames 105 on video monitor 210.

Automated processes may also simulate such rearrangements of the video frame display order that a user may indicate. Some embodiments may also allow randomization or specific, pre-set rearrangements of the time order in which video frames 105 are to be displayed on video monitor 210.

To achieve an optimal or near-optimal transition from one display mode to another display mode, and corresponding optimal or near-optimal display of video frames 105 on video monitor 210, video server 100 may also calculate an encoding parameter specifying the extent of image compression, corresponding to a degree of image resolution, for the images in video frames 105 that are to be included in an encoding of video frames 105 that is to be sent to client video device 140. Based on such an encoding parameter, video server 100 may generate or select an encoding of video frames 105 that compresses the images to the desired degree of resolution. By compressing the images, video server 100 may deliver the images to client video device 140 at the highest, or within some threshold of the highest image resolution possible under a prevailing current combination of constraints or limits on broadband bit rate across wide area network 130 and on the processing speed and memory capacity or other resources at client video device 140, subject to video frame display mode requirements. Video server 100 may, according to various embodiments, employ any known method of image compression to achieve a desired degree of image resolution under the constraints described previously. Video server 100 may, for example, resample images from video frames 105 to reduce their pixel density, thus reducing the degree of image resolution for the images, while compressing the images into representations requiring fewer bits. The pixel density of an image is one measure of the degree of image resolution for the image.

Video server may also calculate various levels of quantization for the various encodings of video frames 105 in order to obtain encodings that capture video frames 105 at the highest, or within some threshold of the highest image resolution possible under a prevailing current combination of constraints or limits on broadband bit rate across wide area network 130 and on the processing speed and memory capacity or other resources at client video device 140, subject to video frame display mode requirements.

To facilitate a transition at client video device 140 from one video display mode to the next, video server 100 may change any of the various encoding parameters described above. For example, video server 100 may send a first encoding of video frames 105 to enable client video device 140 to display video frames 105 in a first video display mode. Subsequently, and in response to an indication from client video device 140 to transition to a second video display mode, video server 100 may generate or select, and then send a second encoding to client video device 140 to enable client video device 140 to display video frames 105 in the second video display mode. The second encoding may involve one or more of:
  a. encoding a different subsequence of the original sequence of video frames 105 than does the first encoding, so that at least one of the first encoding and the second encoding contains only a proper subsequence of the original sequence of video frames;
  b. quantizing image data from video frames 105 at a different quantization level than does the first encoding;
  c. representing images from video frames 105 at a different pixel density than does the first encoding;
  d. compressing the images of video frames 105 to a different degree of compression than does the first encoding;
  e. encapsulating the sequence of video frames 105 into GOPs that contain either more or fewer pictures than do GOPs from the first encoding; and
  f. configuring video frames 105 to be displayed in a different order from the frame display order of the first encoding.

At block 502, video server 100 decides whether to generate the different video encoding of the sequence of video frames 105 to be sent to client video device 140. Since video server 100 may store or have rapid access to one or more existing encodings of video frames 105, it may decide to select the different encoding from among the existing one or more encodings of the sequence of video frames 105 (block 504). According to various embodiments, such a selection by video server 100 may be based on a variety of factors. The selection may be based one or more encoding parameters calculated at block 500. Alternatively, video server 100 may not rely on calculated encoding parameters at all, or may relay on additional factors as a basis for selecting an existing encoding for delivery to client video device 140. The selection may be based wholly, or in part, on received indications received from client video device 140.

For example, if video server 100 receives an indication from client video device 140 to transition from playing the sequence of video frames 105 in normal forward mode to playing the sequence of video frames 105 in fast forward mode, as illustrated in FIG. 6, then it may immediately select an appropriate existing encoding based on either a known current transmission rate limiting the speed at which data currently flows between video server 100 and the remote client video device 140, or on a current processing rate at which remote client video device 140 is currently configured to process video frame encodings, or on both of these factors. The existing encodings may be categorized for immediate selection based upon such known factors. In selecting from among existing encodings, video server 100 may choose an encoding that best approximates an optimal encoding, based upon a tolerance threshold.

If video server 100 cannot locate a suitable existing encoding, then it may immediately generate a suitable encoding. In some instances, a store of encodings of video frames 105 may not exist. For example, if a user has just finished editing video frames 105 using an online video editing environment running on client video device 140, and has submitted the edited video across wide area network 130 for storage on video server 100, there may not be any existing alternative encodings of the newly-edited video frames 105. In such instances, or for other reasons, video server 100 may decide itself to generate an encoding of video frames 105. At block 506, video server 100 dynamically generates the different encoding based on various encoding parameters, as described above, and sends the newly-generated encoding to client video device 140.

In some instances, video server 100 may obtain the different encoding by transcoding, that is, by first decoding a previous encoding of the of the time-ordered sequence of video frames 105 to obtain an un-encoded copy of the time-ordered sequence of video frames 105, and subsequently encoding the un-encoded copy to obtain the different encoding of the time-ordered sequence of video frames 105.

During operation of the system for operating in, and smoothly and adaptively transitioning into and out of, various advanced video display modes, video server 100 may repeatedly transition from modes for stepping discretely through video frames 105, a frame at a time, to modes for continuously sequentially displaying video images 105 on video monitor 210 to simulate for the viewer an appearance of motion that transpires in a smooth and fluid flow.

There are numerous embodiments of a video server 100, and a video player, or online video editing apparatus or environment running on client video device 140 and displaying video frames 105 and using the methods for adaptive streaming described herein. According to one embodiment, video server 100 may dynamically stream video frames 105 in a Flash format, and the video player or online video editing apparatus or environment running on client video device 140 may incorporate a version of Adobe Flash Player configured for displaying video content via the adaptive streaming methods described herein.

Operation of Advanced Playback Modes During Collaborative Online Video Editing

The methods described herein for adaptively streaming video imagery to facilitate advance playback modes may be especially useful when employed in an environment for online video editing.

In such a collaborative setting, video server 100 may function as a central hub for storing and serving video clips and complete video productions. Newly completed time-ordered sequences of video frames 105 may be kept in storage located on video server 100, or in storage linked over a high-speed connection to video server 100. Sequences of video frames 105 that have been edited may also be maintained in local storage, or in storage accessible to video server 100 over a dedicated high speed network. Such sequences of video frames 105 may be accessible for editing that is done either locally, at video server 100, or by computers linked to video server 100 over a high-speed local area network (LAN), or by remote computing devices such as client video devices 140 that communicate with video server 100 over wide area network 130.

If the editing of a sequence of video frames 105 stored by video server 100 is performed locally, from a powerful workstation that is connected to video server 100 by a high-speed channel, then the system may be able to provide trick play modes on the workstation without using the adaptive video streaming techniques described herein. On the other hand, even if it is locally connected over a high-speed pipe to video server 100, a client computer with limited processing power or limited memory capacity may not be able to provide advanced playback modes without adaptive video streaming methods such as the ones described herein.

If the editing of a sequence of video frames 105 stored by video server 100 is performed remotely, over a wide area network 130 such as the Internet, then bandwidth limitations may require adaptive video streaming methods in order to provide trick play modes at client video device 140, regardless of whether or not client video device 140 has limited or excess processing power or memory capacity.

The adaptive video streaming methods described herein permit the use of advance playback modes at client video editing devices 140 even when the client video editing devices 140 must communicate from a remote location with video server 100 over a wide area network 130 that is subject to bandwidth (bit rate) constraints, and even when client video devices 140 are constrained by processing and memory limitations.

There are many embodiments and scenarios for collaborative video editing over a wide area network 130, such as the Internet, in which the availability of trick play modes at one or more client video devices 140 would be very helpful. For example, if a human editor has just completed some edits to a movie, the same human editor may wish to examine the newly-edited movie using various trick play modes. If the editor's computer is constrained by processing or memory limitations, or if the editor's computer is linked to video server 100 over a network subject to bandwidth constraints, then adaptive video streaming methods like the ones described herein may be deployed to permit the human editor to review the newly-edited movie using advanced display modes. Since there may not have been time for video server 100 to generate and store a collection of encodings of the newly-edited movie that are intended for transmission to client computers to enable trick play modes when viewing the movie on the client computers, video server 100 may dynamically generate new encodings in real-time response to the human user's invocation of trick play modes while reviewing the newly-edited movie. If enough time has elapsed for video server 100 to generate and store such a collection of encodings of the newly-edited movie, video server 100 may send various ones of those encodings to the human editor's computer if the editor's computer is constrained by processing or memory limitations, or if the editor's computer is linked to video server 100 over a network subject to bandwidth constraints.

The same principles would apply to other users wanting to review the newly-edited movie. For example, a producer in a different location than the human editor may wish to review the newly-edited movie using a client video device 140, such as a smart phone, that has limited processing capacity. An online video editing system that incorporates the adaptive video streaming methods described herein, facilitating advanced playback, or trick play modes at various client video devices 140, may offer the producer, or other video editing collaborators, the capability for remotely editing, reviewing, or commenting from a variety of client video device platforms 140, while enjoying the advantage of advance playback modes at the various client video device platforms 140.

The adaptive video streaming methods described herein may also be applied to enhance live remote reporting from far-flung locations. For example, a reporter operating remotely from the field with a client video device 140, such as a smart phone or other mobile device, may stream a freshly captured sequence of video frames 105 to video server 100 for storage and processing. The freshly streamed sequence of video frames 105 may then be edited immediately, either by the remote reporter using the client video device 140, or by a collaborator operating remotely from video server 100 with another client video device 140. Such a human editor may have the advantage of using a full suite of trick play modes while editing the sequence of video frames 105 located on video server 100. Following this rapid editing, the edited sequence of video frames 105 may then be served immediately to a viewing audience by any of various means, including on-air broadcast or Internet broadcast.

The movie editing and the news editing described above provide two examples of enhancement of remote video editing through the use of the adaptive video streaming methods described in this document to facilitate trick play modes across various clients of a networked video editing system.

Exemplary Computer System

It is contemplated that in some embodiments, any of the methods, techniques or components described above may be implemented as instructions and data capable of being stored or conveyed via a non-transitory computer-accessible medium. Such methods or techniques may include, for example and without limitation, the various methods for adaptively streaming a time-ordered sequence of video frames from a video server, across wide area network, to a client video device, as described in the foregoing paragraphs. Any partition of the components illustrated in FIG. 1, or any other such array of components as may be implemented in various embodiments to perform the methods and techniques described above, may be implemented as such instructions. Such instructions may be executed to perform a particular computational function, such as generating, sending, or receiving a message, to implement mathematical functions such as integration, differentiation, convolution, etc., as well as to implement higher-order functions such as operating system functioning, network communications functioning, application functioning, and/or any other suitable functions.

Figure 7:
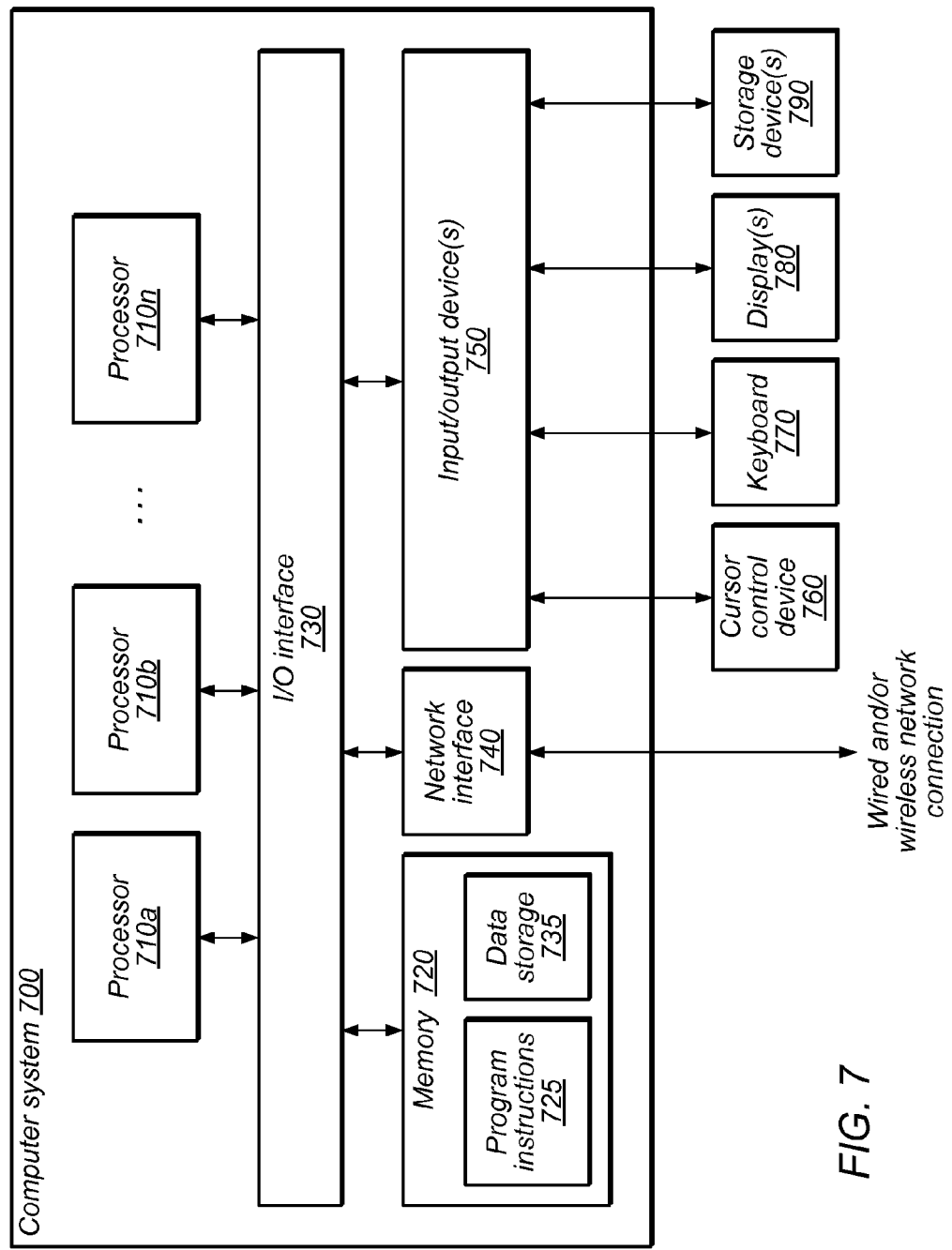
FIG. 7 is a block diagram illustrating an embodiment of a computer system implementing one or more components of a distributed video coding environment wide area network video streaming environment.

One exemplary embodiment of a computer system including tangible, computer-accessible storage media is illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. In different embodiments, system 700 may be variously configured as a desktop computer system, a laptop or notebook or netbook computer, a tablet computer, a mainframe computer system, a workstation, a network computer, a handheld computing device such as a video handheld transceiver, personal digital assistant, cellular phone, media player, or combination device, a camera, a set top box, a mobile device, a consumer device, a video game console, a handheld video game device, an application server, a storage device, a peripheral device such as a printer, copy machine, switch, modem, or router, or another type of computing or electronic device.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 720 as program instructions 725 and data storage 735. It is noted that in some embodiments, program instructions 725 and data storage 735 may include instructions and data implementing desired functions that are not directly executable by processor 710 but are represented or encoded in an abstract form that is translatable to instructions that are directly executable by processor 710. For example, program instructions 725 may include instructions specified in an ISA that may be emulated by processor 710, or by other code executable on processor 710. Alternatively, program instructions 725 may include instructions, procedures or statements implemented in an abstract programming language that may be compiled or interpreted in the course of execution. As non-limiting examples, program instructions 725 may include code specified in a procedural or object-oriented programming language such as C or C++, a scripting language such as Perl or Ruby or Python, a markup language such as HTML or XML, or any other suitable language.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functioning of I/O interface 730, such as an interface to system memory 720, may be incorporated directly into processor 710.

Network interface 740 may be configured to allow data to be exchanged between computer system 700 and other devices attached to a network 750, such as other computer systems or communications devices, for example. In particular, network interface 740 may be configured to allow communication between computer system 700 and various external devices. These external devices may include various computing and communications devices, which may include elements similar to those of computer system 700. In particular, the external devices may include personal computers, telephony devices or network-attached computing devices that users may employ to access network services. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet network, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a tangible, non-transitory computer-accessible storage medium configured to store instructions and data as described above. However, in other embodiments, instructions and/or data may be stored upon and retrieved from different types of computer-accessible storage media. Generally speaking, a non-transitory computer-accessible medium may include storage media or memory media such as magnetic or optical media, e.g., disk or CD/DVD-ROM coupled to computer system 700 via I/O interface 730. A non-transitory computer-accessible medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. A non-transitory computer-accessible medium may generally be accessible via transmission media or signals such as electrical, electromagnetic, or digital signals, which may be conveyed via a communication medium such as a network and/or a wireless link, such as may be accessed via network interface 740.

It is noted that the various methods illustrated in the figures and described above represent exemplary embodiments of methods. These methods may be implemented in software, hardware or any suitable combination thereof. Where suitable, the order of operation of method elements is not restricted to the order described or shown, and in other embodiments various method elements may be performed in a different order. It is also contemplated that in various embodiments, not all method elements need be performed, and existing method elements may be modified or additional elements added.

Although the embodiments above have been described in considerable detail, numerous variations and modifications will become apparent to those skilled in the art once the above disclosure is fully appreciated. It is intended that the following claims be interpreted to embrace all such variations and modifications. Accordingly, the above description is to be regarded in an illustrative rather than a restrictive sense.

What is claimed is:

1. A method, comprising:
performing, by a video player:
receiving an encoding of a time-ordered sequence of video frames from a remote video server over a wide area network;
sending to the remote video server an indication of a change to reduce a current frame display rate at the video player for the time-ordered sequence of video frames, the sending configured to be performed over the wide area network;
subsequent to said sending, receiving from the remote video server a different encoding of the time-ordered sequence of video frames, the different encoding configured for displaying the time-ordered sequence of video frames on the video player at the reduced frame display rate and at an increased resolution for images contained in the time-ordered sequence of video frames such that a bit rate of the reduced frame display rate is not raised in comparison with a bit rate associated with the current frame display rate and pixel densities of the images contained in the different encoding of the time-ordered sequence are higher than pixel densities of images contained in the encoding of the time-ordered sequence associated with the current frame display rate; and
displaying the different encoding of the time-ordered sequence of video frames at the reduced frame display rate and at the increased resolution.

2. The method of claim 1, wherein the encoding and the different encoding encapsulate the time-ordered sequence of video frames at different respective pixel densities corresponding to different degrees of image resolution.

3. The method of claim 1, wherein the encoding and the different encoding each encapsulate the time-ordered sequence of video frames in groups of pictures, wherein the groups of pictures of the encoding contain either more or fewer pictures than the groups of pictures of the different encoding.

4. The method of claim 3, wherein pictures are arranged in the groups of pictures of the encoding in opposite order, with respect to time, than pictures are arranged in the groups of pictures of the different encoding.

5. The method of claim 1, wherein the encoding and the different encoding encapsulate the time-ordered sequence of video frames at different respective degrees of compression.

6. The method of claim 5, wherein the encoding and the different encoding quantize image data from the time-ordered sequence of video frames at different quantization levels to achieve the different respective degrees of compression.

7. The method of claim 1, wherein at least one of the encoding and the different encoding contains only a selected proper subsequence of the time-ordered sequence of video frames.

8. The method of claim 1, wherein differences between the encoding and the different encoding are based on the change in the current frame display rate at the video player or on a reversal in playback direction at the video player.

9. The method of claim 8, wherein the encoding and the different encoding also differ based on at least one of:
a current transmission rate limiting the speed at which data currently flows between the video server and the remote client device; or
a current processing rate at which the remote client device is currently configured to process the sequence of video frames.

10. The method of claim 1, wherein the different encoding encapsulates the sequence of video frames as a subsequence of the sequence of video frames, wherein the subsequence is either a proper subsequence of the sequence of video frames or is the same as the sequence of video frames.

11. The method of claim 8, wherein the different encoding comprises one or more of:
imagery from the time-ordered sequence of video frames that is encapsulated at a different pixel density than a pixel density at which imagery from the time-ordered sequence of video frames is encapsulated in the encoding;
groups of pictures of the time-ordered sequence of video frames, wherein the groups of pictures in the different encoding contain either more or fewer pictures than are contained in groups of pictures of the time-ordered sequence of video frames in the encoding;

pictures from the time-ordered sequence of video frames arranged in an order that is opposite, with respect to time, to an order in which pictures from the time-ordered sequence of video frames are arranged in the encoding;

imagery of the time-ordered sequence of video frames quantized at a quantization level that differs from a quantization level at which imagery of the time-ordered sequence of video frames is quantized in the encoding; or imagery of the time-ordered sequence of video frames compressed to a degree of compression that differs from a degree of compression to which imagery of the time-ordered sequence of video frames IS compressed in the encoding.

12. The method of claim 1, wherein the different encoding comprises a transcoding of the time-ordered sequence of video frames.

13. The method of claim 1, wherein the different encoding is configured for one or more of:

transmission over the wide area network at a current transmission rate limiting the speed at which data currently flows between the remote video server and the video player; or processing on the video player at a current processing rate at which the video player is currently configured to process the sequence of video frames.

14. The method of claim 1, wherein the change in the current frame display rate at the video player decreases the current frame display rate.

15. The method of claim 1, wherein the different encoding configures the time-ordered sequence of video frames for single-step display on the video player.

16. The method of claim 1, wherein the wide area network comprises the Internet, the video player is an Internet-based video player configured to display the sequence of video frames, and the indication sent to the remote video server is based on input to the video player.

17. The method of claim 1, wherein the indication sent to the remote video server is based on input to display the time-ordered sequence of video frames on the video player in a trick play mode.

18. A system, comprising:
a processor; and
a memory coupled to the processor, wherein the memory stores program instructions for a video player performing:
receiving an encoding of a time-ordered sequence of video frames from a remote video server over a wide area network;
sending to the remote video server an indication of a change to reduce a current frame display rate at the video player for the time-ordered sequence of video frames, the sending configured to be performed over the wide area network; and
subsequent to said sending, receiving from the remote video server a different encoding of the time-ordered sequence of video frames, the different encoding configured for displaying the time-ordered sequence of video frames on the video player at the reduced frame display rate and at an increased resolution for images contained in the time-ordered sequence of video frames such that a bit rate of the reduced frame display rate is not raised in comparison with a bit rate associated with the current frame display rate and pixel densities of the images contained in the different encoding of the time-ordered sequence are higher than pixel densities of images contained in the encoding of the time-ordered sequence associated with the current frame display rate.

19. A computer-readable storage device comprising instructions stored thereon that, responsive to execution by a video player, causes the video player to perform operations comprising:
receiving an encoding of a time-ordered sequence of video frames from a remote video server over a wide area network;
sending to the remote video server an indication of a change to reduce a current frame display rate at the video player for the time-ordered sequence of video frames; and
subsequent to said sending, receiving from the remote video server a different encoding of the time-ordered sequence of video frames, the different encoding configured for displaying the time-ordered sequence of video frames on the video player at the reduced frame display rate and at an increased resolution for images contained in the time-ordered sequence of video frames based on the indication such that a bit rate for the reduced frame display rate is not raised in comparison with a bit rate associated with the current frame display rate and pixel densities of the images contained in the different encoding of the time-ordered sequence are higher than pixel densities of images contained in the encoding of the time-ordered sequence associated with the current frame display rate.

20. The computer-readable storage device of claim 19, wherein differences between the encoding and the different encoding are based on the change in the current frame display rate at the video player.

* * * * *